US012112044B2

(12) United States Patent
Lemberg et al.

(10) Patent No.: US 12,112,044 B2
(45) Date of Patent: Oct. 8, 2024

(54) RECOGNITION AND REPORT OF EXPECTED WRITE AMPLIFICATION VIOLATION

(71) Applicant: Western Digital Technologies, Inc., San Jose, CA (US)

(72) Inventors: Alexander Lemberg, Netanya (IL); Aki Bleyer, Givatayim (IL); Rotem Sela, Sunnyvale, CA (US)

(73) Assignee: Sandisk Technologies, Inc., Milpitas, CA (US)

( * ) Notice: Subject to any disclaimer, the term of this patent is extended or adjusted under 35 U.S.C. 154(b) by 232 days.

(21) Appl. No.: 17/743,391

(22) Filed: May 12, 2022

(65) Prior Publication Data

US 2023/0367485 A1    Nov. 16, 2023

(51) Int. Cl.
   *G06F 3/06*    (2006.01)
(52) U.S. Cl.
   CPC .......... *G06F 3/0616* (2013.01); *G06F 3/0619* (2013.01); *G06F 3/0659* (2013.01); *G06F 3/0679* (2013.01)
(58) Field of Classification Search
   CPC .... G06F 3/0616; G06F 3/0619; G06F 3/0659; G06F 3/0679; G06F 3/0653
   See application file for complete search history.

(56) References Cited

U.S. PATENT DOCUMENTS

| | | | |
|---|---|---|---|
| 9,348,520 B2 | 5/2016 | Ding et al. | |
| 10,871,916 B2 | 12/2020 | Shin | |
| 11,188,461 B2 | 11/2021 | Liang et al. | |
| 11,194,482 B1 | 12/2021 | Agarwal | |
| 2014/0359198 A1 | 12/2014 | Zaltsman et al. | |
| 2019/0332311 A1* | 10/2019 | Shin | G11C 16/32 |
| 2020/0249851 A1* | 8/2020 | Allert | G06F 3/0653 |
| 2021/0397367 A1* | 12/2021 | Kang | G06F 12/0246 |
| 2022/0404976 A1* | 12/2022 | Bi | G06F 3/0616 |

\* cited by examiner

*Primary Examiner* — Hiep T Nguyen
(74) *Attorney, Agent, or Firm* — PATTERSON + SHERIDAN, LLP (57) ABSTRACT

The present disclosure generally relates to recognizing a violation of an expected write amplification (WAF) rate and informing a host device of the violation so that the host device may take corrective action and ensure the data storage device does not reach end of life (EOL) earlier than expected. The host can provide the data storage device with an expected lifetime and may additionally provide a benchmark WAF rate. The data storage device compares the actual WAF rate to the benchmark WAF rate and notifies the host device of any violation where the actual WAF rate exceeds the benchmark WAF rate.

20 Claims, 5 Drawing Sheets

RECOGNITION AND REPORT OF EXPECTED WRITE AMPLIFICATION VIOLATION

BACKGROUND OF THE DISCLOSURE

Field of the Disclosure

Embodiments of the present disclosure generally relate to data storage devices, such as solid state drives (SSDs), and, more specifically, recognizing a violation of an expected write amplification (WAF) rate.

Description of the Related Art

Data storage device lifetime is heavily dependent upon host device write activity behavior. Each data storage device has a program-erase cycle (PEC) limit, which may be different for each data storage device.

Host devices can, unknowingly, run malicious software (SW) that may issue unexpectedly high amounts of write operations on the data storage device. The greater the number of write operations, the higher WAF rate that occurs. Higher WAF rates lead to a shorter data storage device lifetime. For example, if the expected lifetime of a given data storage device is 10 years, the unintentional multiplying of the WAF rate by malicious SW may reduce the data storage device lifetime to 3 years.

Additionally, unexpected operations of the host device may wear out the data storage device prematurely. In other words, the data storage device may enter "end-of-life" conditions quicker than advertised.

Therefore, there is a need in the art for an improved data storage device that identifies WAF rate violations.

SUMMARY OF THE DISCLOSURE

The present disclosure generally relates to recognizing a violation of an expected write amplification (WAF) rate and informing a host device of the violation so that the host device may take corrective action and ensure the data storage device does not reach end of life (EOL) earlier than expected. The host can provide the data storage device with an expected lifetime and may additionally provide a benchmark WAF rate. The data storage device compares the actual WAF rate to the benchmark WAF rate and notifies the host device of any violation where the actual WAF rate exceeds the benchmark WAF rate.

In one embodiment, a data storage device comprises: a memory device; and a controller coupled to the memory device, wherein the controller is configured to: determine an expected WAF rate; determine an actual WAF rate; compare the expected WAF rate to the actual WAF rate; and inform a host device of results of the comparing.

In another embodiment, a data storage device comprises: a memory device; and a controller coupled to the memory device, wherein the controller is configured to: receive an expected WAF rate from a host device; calculate an actual WAF rate; determine the actual WAF rate is greater than the expected WAF rate; and inform the host device that the actual WAF rate is greater than the expected WAF rate.

In another embodiment, a data storage device comprises: memory means; a controller coupled to the memory means, wherein the controller is configured to: determine a violation of a WAF rate, wherein the WAF rate is based upon determining an actual WAF rate is greater than an estimated WAF rate provided by a host device; and inform the host device of the violation.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to recognizing a violation of an expected write amplification (WAF) rate and informing a host device of the violation so that the host device may take corrective action and ensure the data storage device does not reach end of life (EOL) earlier than expected. The host can provide the data storage device with an expected lifetime and may additionally provide a benchmark WAF rate. The data storage device compares the actual WAF rate to the benchmark WAF rate and notifies the host device of any violation where the actual WAF rate exceeds the benchmark WAF rate.

Figure 1:
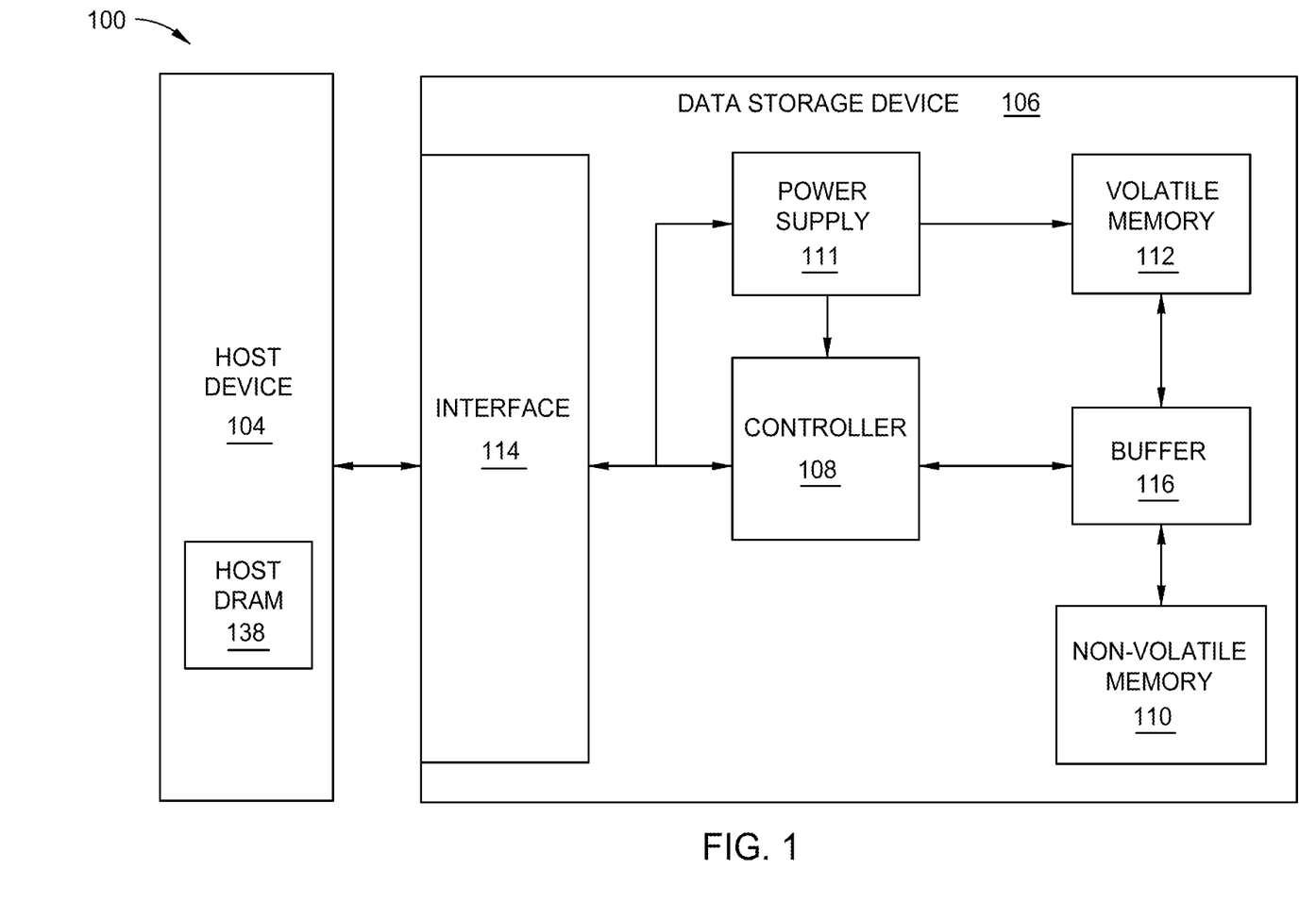
FIG. 1 is a schematic block diagram illustrating a storage system in which a data storage device may function as a storage device for a host device, according to certain embodiments.

FIG. 1 is a schematic block diagram illustrating a storage system 100 having a data storage device 106 that may function as a storage device for a host device 104, according to certain embodiments. For instance, the host device 104 may utilize a non-volatile memory (NVM) 110 included in data storage device 106 to store and retrieve data. The host device 104 comprises a host DRAM 138. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network-attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The data storage device 106 includes a controller 108, NVM 110, a power supply 111, volatile memory 112, the interface 114, and a write buffer 116. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106 or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the data storage device 106 may be directly coupled (e.g., directly soldered or plugged into a connector) to a motherboard of the host device 104.

Interface 114 may include one or both of a data bus for exchanging data with the host device 104 and a control bus for exchanging commands with the host device 104. Interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. Interface 114 (e.g., the data bus, the control bus, or both) is electrically connected to the controller 108, providing an electrical connection between the host device 104 and the controller 108, allowing data to be exchanged between the host device 104 and the controller 108. In some examples, the electrical connection of interface 114 may also permit the data storage device 106 to receive power from the host device 104. For example, as illustrated in FIG. 1, the power supply 111 may receive power from the host device 104 via interface 114.

The NVM 110 may include a plurality of memory devices or memory units. NVM 110 may be configured to store and/or retrieve data. For instance, a memory unit of NVM 110 may receive data and a message from controller 108 that instructs the memory unit to store the data. Similarly, the memory unit may receive a message from controller 108 that instructs the memory unit to retrieve data. In some examples, each of the memory units may be referred to as a die. In some examples, the NVM 110 may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit may include any type of non-volatile memory devices, such as flash memory devices, phase-change memory (PCM) devices, resistive random-access memory (ReRAM) devices, magneto-resistive random-access memory (MRAM) devices, ferroelectric random-access memory (F-RAM), holographic memory devices, and any other type of non-volatile memory devices.

The NVM 110 may comprise a plurality of flash memory devices or memory units. NVM Flash memory devices may include NAND or NOR-based flash memory devices and may store data based on a charge contained in a floating gate of a transistor for each flash memory cell. In NVM flash memory devices, the flash memory device may be divided into a plurality of dies, where each die of the plurality of dies includes a plurality of physical or logical blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 may write data to and read data from NVM flash memory devices at the page level and erase data from NVM flash memory devices at the block level.

The power supply 111 may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super-capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The volatile memory 112 may be used by controller 108 to store information. Volatile memory 112 may include one or more volatile memory devices. In some examples, controller 108 may use volatile memory 112 as a cache. For instance, controller 108 may store cached information in volatile memory 112 until the cached information is written to the NVM 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)).

Controller 108 may manage one or more operations of the data storage device 106. For instance, controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. Controller 108 may determine at least one operational characteristic of the storage system 100 and store at least one operational characteristic in the NVM 110. In some embodiments, when the data storage device 106 receives a write command from the host device 104, the controller 108 temporarily stores the data associated with the write command in the internal memory or write buffer 116 before sending the data to the NVM 110.

Modern flash based data storage devices calculate the flash device program-erase cycle (PEC) count as well as reporting the data storage device lifetime estimation in a data storage device health report that is provided to a host device. It is the host device's responsibility to periodically read the data storage device health report, determine whether the PEC count is progressing as expected or as preliminary estimated, and decide on a course of action based upon the determination.

Figure 2:
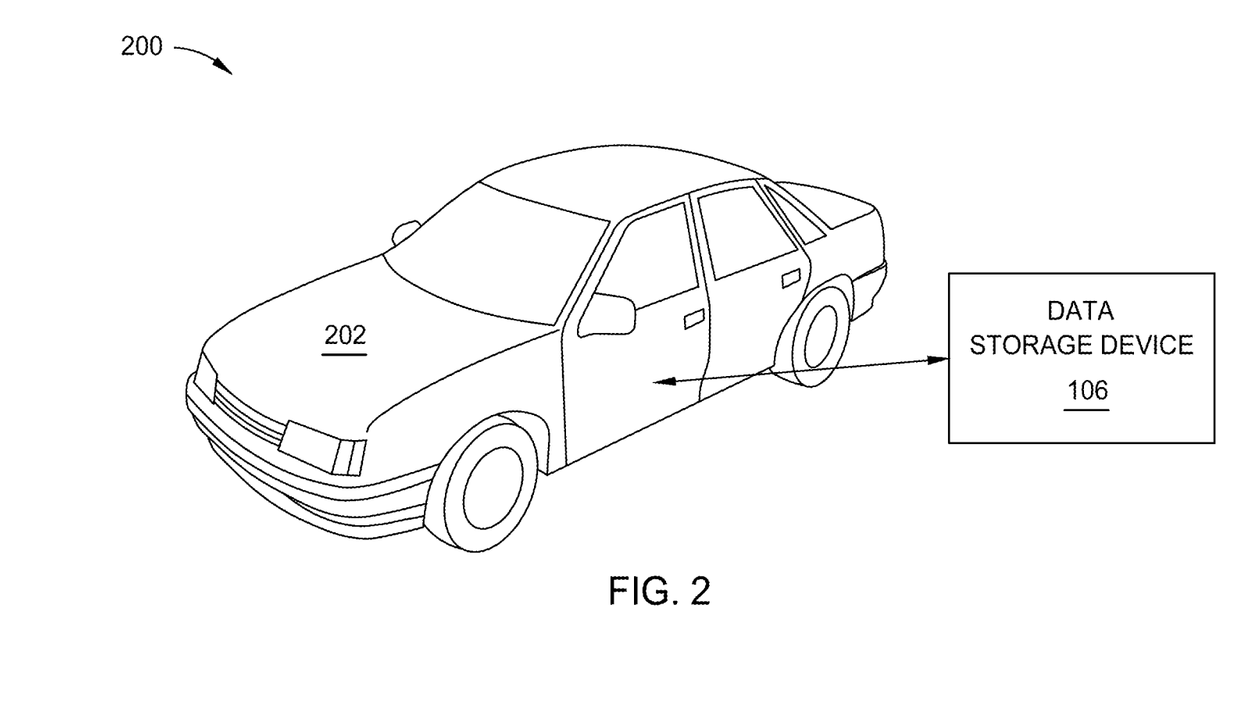
FIG. 2 is a schematic illustration of an automobile utilizing a data storage device according to one embodiment.
Figure 3:
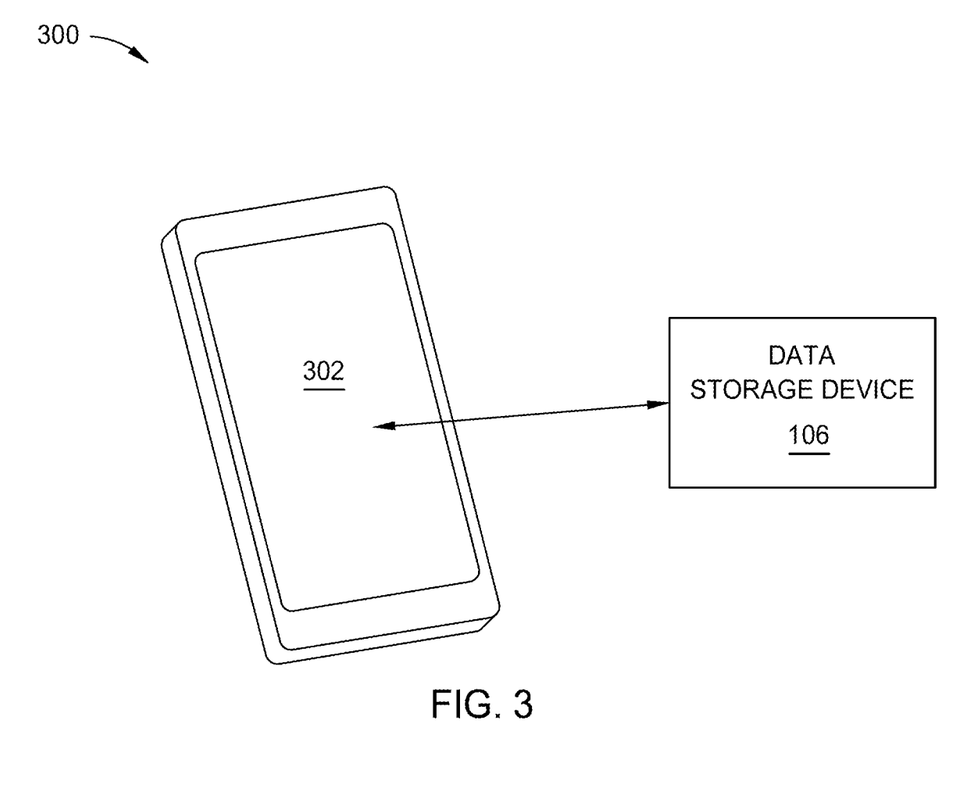
FIG. 3 is a schematic illustration of a mobile device utilizing a data storage device according to one embodiment.

FIG. 2 is a schematic illustration 200 of an automobile 202 utilizing a data storage device 106 according to one embodiment. FIG. 3 is a schematic illustration 300 of a mobile device 302 utilizing a data storage device 106 according to one embodiment. Both the automobile 202 and the mobile device 302 are examples of host devices 104 that utilize data storage devices 106. It is to be understood that while the data storage devices 106 have been shown outside of the host devices 104 for the automobile 202 and mobile device 302, the location is simply for ease of illustration. The data storage device 106 is expected to be located within the automobile 202 or mobile device 302.

When a host device 104 using a data storage device 106, such as an automobile 202 using data storage device 106, is released, there is an expected lifetime. For example, an automobile 202 may have an expected lifetime of about 15 years. For a mobile device 302, the expected lifetime may be about 3 years. The data storage device 106 needs to last for the entire expected lifetime of the host device 104 else the data storage device 106 will need to be replaced. Thus, automobile manufacturers and mobile device manufacturers are looking for a way to limit data storage device 106 failures and hence, electrical system failures.

The memory device of the data storage device has a lifetime that is based upon the PEC count. Once the PEC count is reached, the memory device of the data storage device 106 can no longer be used. In the case of an automobile 202 or mobile device 302, the automobile 202 or mobile device 302 may be rendered unusable until the data storage device 106 is replaced.

Knowing the expected lifetime of the host device 104 can greatly help the data storage device 106 properly recognize and detect issues impacting the data storage device 106 lifetime and hence, host device 104 lifetime. Reporting the recognized and/or detected issues to the host device 104 can ensure the host device 104 has an opportunity to try and fix the issues. As will be discussed herein, the data storage device implements a mechanism for recognizing and reporting expected WAF count violations. The data storage device 106 will recognize the WAF rate violation based upon the either a calculated WAF rate using the expected host device 104 lifetime or based upon an expected WAF rate provided by the host device 104.

In one embodiment, the WAF rate is supplied to the data storage device 106 by the host device 104. The host device 104 provides an estimated WAF rate, which is unique to the specific host device 104, operating system, or platform segment. The host device 104 provides the estimated WAF rate to the data storage device 106 during a pre-defined window near the beginning of life of the host device 104. For each unique host device 104, the estimated WAF rate should be set during the host platform production upon flash based device configuration. For example, the host device 104 may decide to configure an expected WAF rate per year value during data storage device 106 configuration. The data storage device 106, upon receipt of the expected WAF rate per year, can calculate an expected WAF rate per month, for example, compare the expected WAF rate to an actual WAF rate, and report any violation to the host device 104. More specifically, the data storage device 106 will compare the expected WAF rate to the actual WAF rate for a predetermined time period (e.g., year, month, week, day, hour, etc.). If the actual WAF rate is greater than the expected WAF rate, the data storage device 106 notifies the host device 104 of the WAF rate violation so that the host device 104 may then take corrective measures to reduce the actual WAF rate. One example manner of informing the host device of the WAF rate violation is to set a dedicated bit in a universal flash storage (UFS) protocol information unit (UPIU) response data structure. By receiving the notification from the data storage device 106, the host device 104, or vendor in the case of an automobile 202, may start looking for malicious software (SW) in order to stop the problematic behaviors, save the data storage device 106 lifetime, and preserve the host device 104 from failures and data corruptions. For an automobile 202, the mechanism will work similar to an oil or gas level notification in an automobile. The data storage device 106 will periodically save the data storage device health report for historical purposes and predictions.

Figure 4:
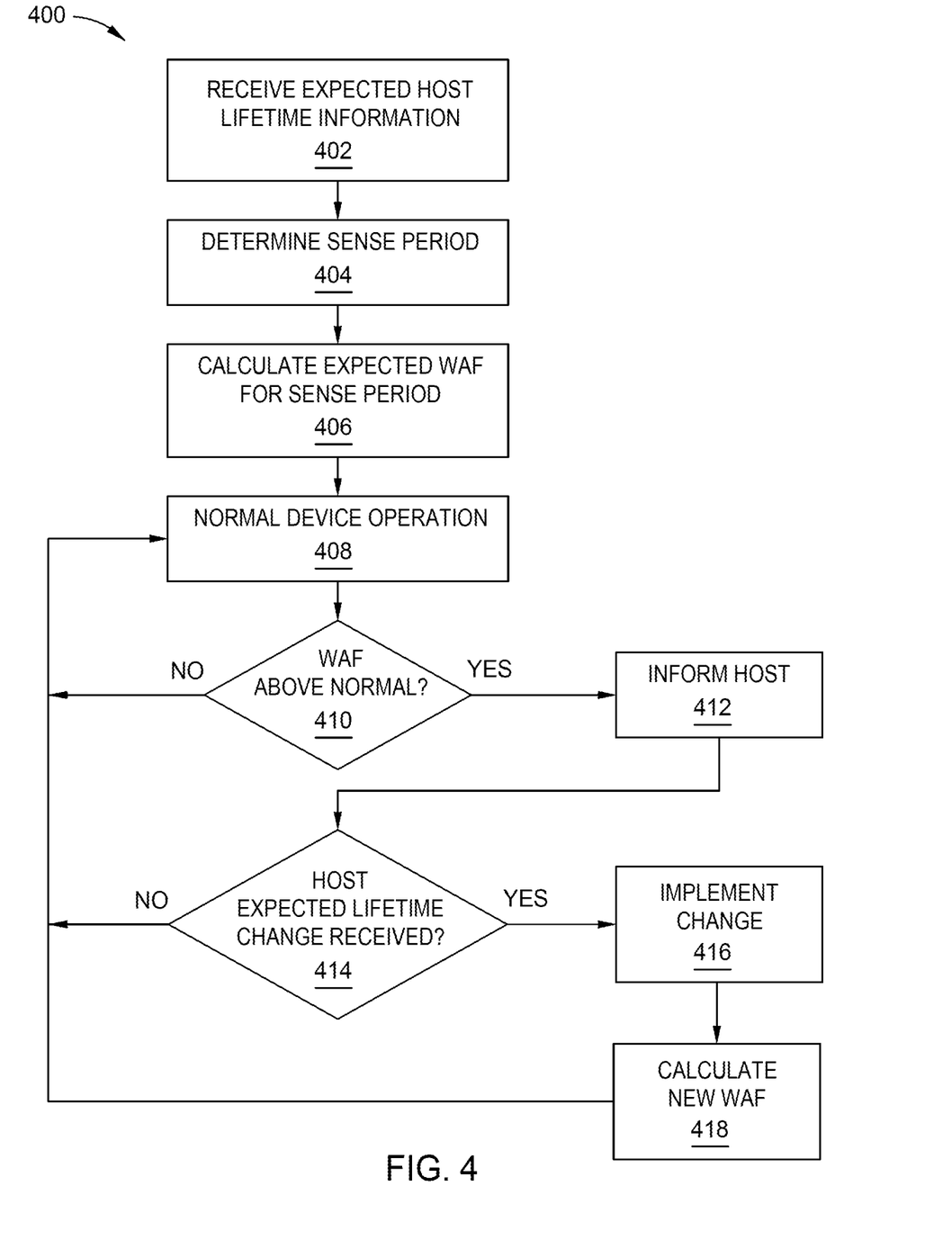
FIG. 4 is a flowchart illustrating detection of a WAF rate violation according to one embodiment.

FIG. 4 is a flowchart 400 illustrating detection of a WAF rate violation according to one embodiment. In the embodiment shown in FIG. 4, the data storage device calculates the expected WAF rate based upon the host device expected lifetime. Initially, the data storage device optionally receives the expected lifetime information from the host device at 402. A sense period is also determined at 404. The sense period may be set by the host device or by the data storage device and may be for a year, month, week, day, hour, minute, etc. and is the period of time for which the WAF rate is calculated. The expected WAF rate for the sense period is then calculated at 406 and normal device operation begins at 408.

After completing a sense period, the actual WAF rate is calculated and then compared to the expected WAF rate at

410. If the actual WAF rate is equal to or less than the expected WAF rate, the data storage device continues normal operations at 408. If the calculated WAF rate is greater than the expected WAF rate, then the data storage device informs the host device at 412. The host device may take corrective action and may provide an updated lifetime value as well as corrective action instructions to the data storage device at 414. If nothing is received from the host device, normal operations continue at 408. If something is received from the host device, then the data storage device implements the change at 416, calculates a new WAF rate at 418, and continues normal operations at 408.

One example of corrective action or change instructed by the host device that can be taken at 416 is disabling SLC cache (i.e., write booster) to reduce WAF and PEC caused by internal block relocation. Another corrective action is disabling other data storage device features such as defragmentation or garbage collection to reduce WAF or PEC caused by internal block relocations. A further corrective action is to use the SLC cache blocks as TLC blocks which thus increases the number of spare blocks in the data storage device. Increasing the number of spare blocks leads to the data storage device being able to set a higher threshold validity count for garbage collection rather than marking a block for garbage collection at a certain percentage of validity count. Another corrective action is lowering the validity count percentage level to reduce frequency of garbage collection. An additional corrective action is changing NVM trim parameters for programming that result in less wearing out of the NVM at the expense of data retention time.

Figure 5:
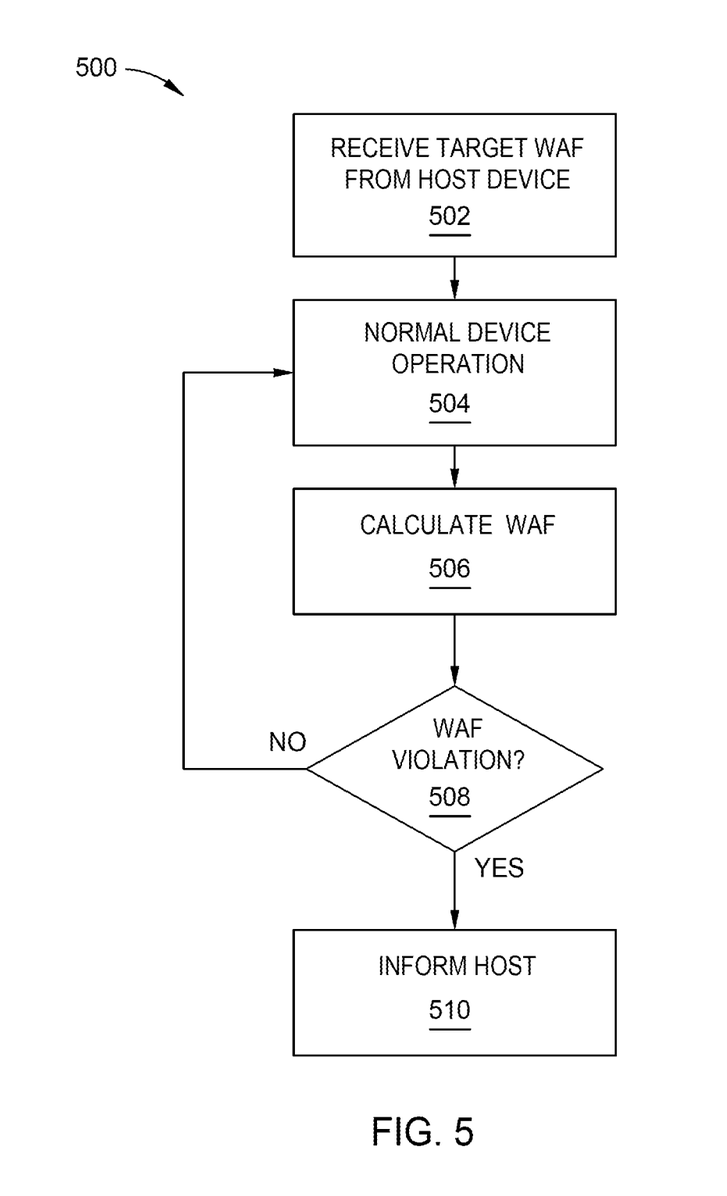
FIG. 5 is a flowchart illustrating detection of a WAF rate violation according to another embodiment.

FIG. 5 is a flowchart 500 illustrating detection of a WAF rate violation according to another embodiment. In the embodiment shown in FIG. 5, the host device provides the expected WAF rate to the data storage device. At 502, the data storage device receives the target or expected WAF rate from the host device. The data storage device performs normal operation at 504 and calculates the actual WAF rate at 506. If the actual WAF rate is at or below the expected WAF rate at 508, then normal device operations continues at 504. However, if the actual WAF rate is above the expected WAF rate at 508, then the data storage device informs the host device at 510 of the WAF rate violation. The host device may then take corrective action such as searching for and removing malicious SW.

By detecting and reporting WAF rate violations to a host device, the data storage device expected lifetime can be maintained and the host device can take corrective action. Previous solutions involve the host device reading a health report provided by the data storage device. Stated another way, previous solutions involved the data storage device having a passive role. The instant disclosure involves the data storage device actively monitoring for WAF rate violations and specifically informing the host device of the violations. The host device may then, if desired, take corrective action, which may prevent unexpected EOL issues for the data storage device. The host device may decide to not provide an expected WAF, and the data storage device may simply calculate an expected WAF based upon a provided host device lifetime.

In one embodiment, a data storage device comprises: a memory device; and a controller coupled to the memory device, wherein the controller is configured to: determine an expected write amplification factor (WAF) rate; determine an actual WAF rate; compare the expected WAF rate to the actual WAF rate; and inform a host device of results of the comparing. Informing the host device comprises informing the host device that the actual WAF rate is greater than the expected WAF rate. Determining an expected WAF rate comprises receiving the expected WAF rate from the host device. The controller is further configured to: receive an expected host lifetime value; determine a sense period; and the determining the expected WAF rate based upon the expected host lifetime value and the sense period. The determining the expected WAF rate comprises dividing the expected host lifetime value by the sense period such that the expected WAF rate is equally distributed across each sense period over the expected host lifetime value. Determining the sense period comprises receiving a sense period value from the host device. The host device is an automobile. The host device is a mobile device. The controller is further configured to: determine a new expected WAF rate; calculate a new actual WAF rate; compare the new actual WAF rate to the new expected WAF rate; and inform the host device when the new actual WAF rate is greater than the new expected WAF rate. The determining a new expected WAF rate occurs after informing the host device of results of the comparing.

In another embodiment, a data storage device comprises: a memory device; and a controller coupled to the memory device, wherein the controller is configured to: receive an expected write amplification factor (WAF) rate from a host device; calculate an actual WAF rate; determine the actual WAF rate is greater than the expected WAF rate; and inform the host device that the actual WAF rate is greater than the expected WAF rate. The actual WAF rate is calculated over a predetermined period of time. The predetermined period of time is set by the host device. The data storage device is configured to be secured by the host device after informing the host device that the actual WAF rate is greater than the expected WAF rate. The expected WAF rate is for a first period of time and the actual WAF rate is for a second period of time that is different from the first period of time. The first period of time is set by the host device and the second period of time is set by the data storage device. Informing the host device comprises setting a bit in a universal flash storage (UFS) protocol information unit (UPIU) response data structure.

In another embodiment, a data storage device comprises: memory means; a controller coupled to the memory means, wherein the controller is configured to: determine a violation of a write amplification factor (WAF) rate, wherein the WAF rate is based upon determining an actual WAF rate is greater than an estimated WAF rate provided by a host device; and inform the host device of the violation. The controller is configured to receive an indication from the host device that the host device has initiated detection of malicious software (SW) in response to the informing. The controller is configured to calculate a data storage device lifetime based upon the determining.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
 a memory device; and
 a controller coupled to the memory device, wherein the controller is configured to:
  determine an expected write amplification factor (WAF) rate;
  determine an actual WAF rate;
  compare the expected WAF rate to the actual WAF rate;

inform a host device of results of the comparing;
receive an updated lifetime value and corrective action from the host device;
implement the corrective action; and
calculate a new WAF.

2. The data storage device of claim 1, wherein informing the host device comprises informing the host device that the actual WAF rate is greater than the expected WAF rate.

3. The data storage device of claim 1, wherein determining an expected WAF rate comprises receiving the expected WAF rate from the host device.

4. The data storage device of claim 1, wherein the controller is further configured to:
receive an expected host lifetime value;
determine a sense period; and
the determining the expected WAF rate based upon the expected host lifetime value and the sense period.

5. The data storage device of claim 4, wherein the determining the expected WAF rate comprises dividing the expected host lifetime value by the sense period such that the expected WAF rate is equally distributed across each sense period over the expected host lifetime value.

6. The data storage device of claim 5, wherein determining the sense period comprises receiving a sense period value from the host device.

7. The data storage device of claim 1, wherein the host device is an automobile.

8. The data storage device of claim 1, wherein the host device is a mobile device.

9. The data storage device of claim 1, wherein the controller is further configured to:
determine a new expected WAF rate;
calculate a new actual WAF rate;
compare the new actual WAF rate to the new expected WAF rate; and
inform the host device when the new actual WAF rate is greater than the new expected WAF rate.

10. The data storage device of claim 1, wherein the determining a new expected WAF rate occurs after informing the host device of results of the comparing.

11. A data storage device, comprising:
a memory device; and
a controller coupled to the memory device, wherein the controller is configured to:
receive an expected write amplification factor (WAF) rate from a host device;
calculate an actual WAF rate;
determine the actual WAF rate is greater than the expected WAF rate;
inform the host device that the actual WAF rate is greater than the expected WAF rate;
receive an updated lifetime value and corrective action from the host device;
implement the corrective action; and
calculate a new WAF.

12. The data storage device of claim 11, wherein the actual WAF rate is calculated over a predetermined period of time.

13. The data storage device of claim 12, wherein the predetermined period of time is set by the host device.

14. The data storage device of claim 11, wherein the data storage device is configured to be secured by the host device after informing the host device that the actual WAF rate is greater than the expected WAF rate.

15. The data storage device of claim 11, wherein the expected WAF rate is for a first period of time and the actual WAF rate is for a second period of time that is different from the first period of time.

16. The data storage device of claim 15, wherein the first period of time is set by the host device and the second period of time is set by the data storage device.

17. The data storage device of claim 11, wherein informing the host device comprises setting a bit in a universal flash storage (UFS) protocol information unit (UPIU) response data structure.

18. A data storage device, comprising:
memory means;
a controller coupled to the memory means, wherein the controller is configured to:
determine a violation of a write amplification factor (WAF) rate, wherein the WAF rate is based upon determining an actual WAF rate is greater than an estimated WAF rate provided by a host device;
inform the host device of the violation;
receive an updated lifetime value and corrective action from the host device;
implement the corrective action; and
calculate a new WAF.

19. The data storage device of claim 18, wherein the controller is configured to receive an indication from the host device that the host device has initiated detection of malicious software (SW) in response to the informing.

20. The data storage device of claim 18, wherein the controller is configured to calculate a data storage device lifetime based upon the determining.

* * * * *